Dec. 7, 1943.    R. E. GOULD    2,336,089
REFRIGERATING APPARATUS
Filed Jan. 31, 1941    2 Sheets-Sheet 1
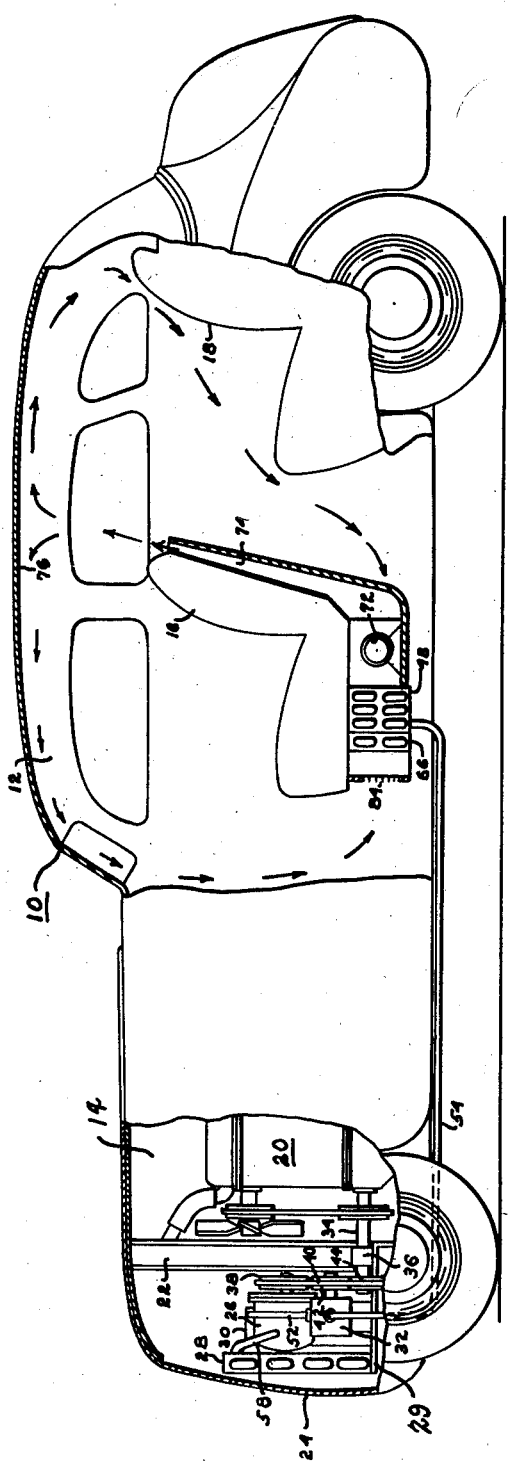
INVENTOR.
Richard E. Gould
BY Spencer, Hardman & Fehr Patented Dec. 7, 1943

2,336,089

UNITED STATES PATENT OFFICE 2,336,089

REFRIGERATING APPARATUS

Richard E. Gould, Oakwood, Ohio, assignor to General Motors Corporation, Dayton, Ohio, a corporation of Delaware Application January 31, 1941, Serial No. 376,880

4 Claims. (Cl. 62—117)

This invention relates to refrigerating apparatus and more particularly to improved method and apparatus for conditioning air for an automobile or the like.

Although automobile air conditioning systems have been available to the public for many years, very few such systems have been sold because of their high initial cost and because of various installation problems involved. Garages have neither the skilled men nor the equipment necessary for charging a volatile refrigerant air cooling system. One object of this invention, therefore, is to so construct and arrange the cooling system so that the volatile refrigerant circuit may be charged at the factory and need not be disturbed thereafter.

Many different arrangements have been proposed, some of which are now in use, for distributing conditioned air within an automobile but none of the prior art arrangements are fully satisfactory for year around air conditioning purposes. The problems of distributing conditioned air within a five passenger automobile, for example, are entirely different than the problems involved in distributing air in an office or even the passenger compartment of a bus or a railway vehicle. In view of the small space involved and the compactness of the seats, very minor differences in the air directing means very materially alters the distribution of the air within the car. Furthermore, in the prior art arrangements, slight variations in the arrangement of the dash board and the like, very materially alter the path of the air circulating through the vehicle. Because of this fact, some of the prior art systems which are satisfactory in certain makes of automobiles are not fully satisfactory for other makes of automobiles. It is an object of this invention to provide a system which is not materially influenced by any differences in the arrangement of the dash board and the like.

Another object of this invention is to provide an improved arrangement for mounting the refrigerating apparatus within the engine compartment of a vehicle.

Still another object of this invention is to provide an improved air conditioning system in which a single air distributing arrangement may be used for both winter and summer air conditioning purposes.

Another object of this invention is to so construct and arrange the parts of an air cooling unit so that they may be mounted in space which is normally wasted.

Further objects and advantages of the present invention will be apparent from the following description, reference being had to the accompanying drawings, wherein a preferred form of the present invention is clearly shown.

In the drawings:

Fig. 1 is an elevational view of a car with parts broken away showing a preferred embodiment of my invention;

Fig. 2 is a plan view partly diagrammatic showing the arrangement of the air cooling apparatus;

Figure 3:
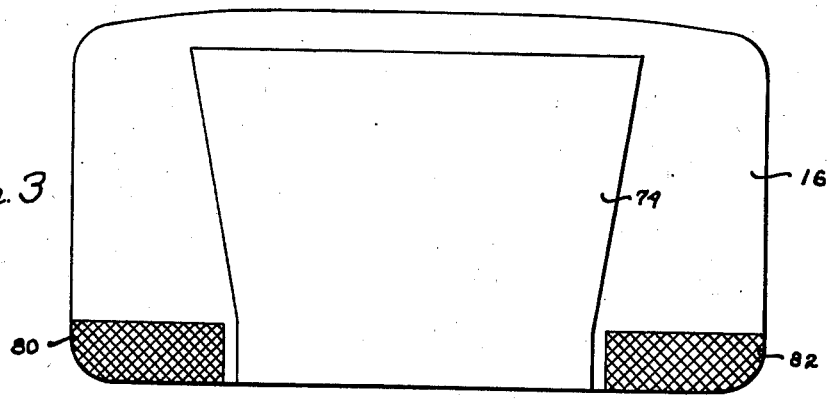
Fig. 3 is an elevational view showing the arrangement of the air duct and the return air grills with respect to the back of the driver's seat.

As shown in the drawings, reference numeral 10 designates a conventional five passenger automobile provided with the usual passenger compartment 12 and engine compartment 14. The passenger compartment is provided with a front seat 16 and back seat 18.

The usual automobile engine 20 is mounted within the engine compartment 14 and the engine radiator 22 is mounted directly in front of the engine in accordance with standard practice. In most all modern cars the space between the engine radiator 22 and the front wall or grill 24, of the engine compartment, is sufficiently large so that a complete, compact refrigerating system may be mounted within that space. Thus as shown, a compressor 26, condenser 28, water cooling evaporator 30 and water pump 32 may all be mounted in front of the engine radiator 22.

The main car engine 20 is provided with a crank shaft extension 34 which is journalled in the bearing 36. A pulley 38 is mounted on the end of the extension 34 and supplies power to the compressor 26 and the water pump 32 through the belt 40. In the arrangement shown, a single belt 40 passes around the crank shaft pulley 38, the compressor pulley 42 and the water pump pulley 44. The position of the compressor with respect to the shaft 34 is fixed, whereas the pump 32 is preferably adjustably mounted so as to serve as a belt tightening means.

Figure 5:
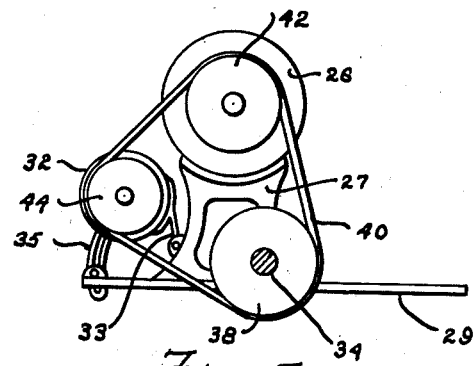
Fig. 5 shows the belt tightening arrangement.

As shown in Fig. 5, the compressor 26 is mounted on a bracket 27 carried by the main automobile frame 29. The water pump 32 which serves as a belt tightening means is pivotally mounted by means of the hinged member 33. The pump 32 is held in its proper position by means of the adjustable arm 35 of conventional construction.

The evaporator unit 30 is of the type which cools water or some other suitable heat transfer liquid which may be piped to the main air cooling coils 46 and 48 located under the front seat. Water from the coils 46 and 48 returns to the evaporator 30 through the line 50. The pump 32 withdraws water from the evaporator 30 through the line 52 and discharges the chilled water through the line 54 which leads to the air cooling coils 46 and 48. The compressor 26 withdraws refrigerant vapor from evaporator 30 through the line 56 and discharges compressed refrigerant to the condenser 28 through the line 58. The condensed refrigerant returns to the evaporator through the line 60. A refrigerant control member 62 is provided in the line 60. The member 62 may be a conventional thermostatic expansion valve, as shown, or a fixed restrictor. Since both types of controls are well known, they need no further explanation. Reference numerals 64 and 66 designate the conventional heating coils which may be supplied with a heating fluid in accordance with standard practice. The air to be conditioned is circulated by means of a pair of blowers 68 and 70, driven by means of a motor 72. In order to efficiently distribute a portion of the conditioned air to the forward portion of the passenger compartment and another portion of the conditioned air to the rearward portion of the passenger compartment without the necessity of providing separate air outlets for each portion, I provide an air duct 74 along the back of the front seat. All of the conditioned air is discharged into this duct and discharges into the passenger compartment from the upper end of the duct. The angle at which the air discharging through the duct 74 strikes the ceiling 76 of the passenger compartment is so arranged that the proper proportion of conditioned air is deflected in each direction.

Figure 4:
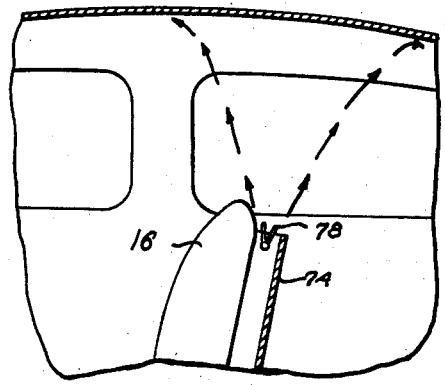
Fig. 4 is a fragmentary view showing a slightly modified arrangement for distributing the conditioned air.

In Fig. 4, I have shown a slightly modified arrangement for distributing the conditioned air. As shown in this figure, an air deflector 78 has been provided adjacent the outlet of the duct 74. By adjusting the position of the air deflector 78, the amount of air discharged in each direction may be varied. By virtue of this arrangement all of the conditioned air may be discharged toward the front portion of the car or toward the rear portion of the car, depending upon the wishes of the passengers.

In either modification, the air returns to the cooling units through the return air grills 80, 82 and 84. The return air grills 80 and 82 withdraw air from the rear portion of the passenger compartment whereas the return air grills 84 withdraw air from the front portion of the passenger compartment.

By virtue of the arrangement described hereinabove, the complete air conditioning system may be installed in an automobile by an ordinary garage mechanic. The refrigerating system may be charged with refrigerant at the factory since the compressor, condenser, and the evaporator are all mounted close together and may be installed without disturbing the connections between the compressor, the condenser and the evaporator. All of the parts of the air conditioning system are mounted so as to utilize waste space only. Furthermore, the arrangement of the refrigerating apparatus within the engine compartment is such that the refrigerating apparatus does not interfere with the servicing of the main car engine.

While the form of embodiment of the invention as herein disclosed, constitutes a preferred form, it is to be understood that other forms might be adopted, all coming within the scope of the claims which follow.

What is claimed is as follows:

1. In a vehicle having a passenger compartment and an engine compartment; an engine within said engine compartment; a radiator in front of said engine for dissipating waste engine heat; grill means in the front wall of said engine compartment and spaced from said radiator; refrigerating apparatus mounted in the space between said grill means and said engine radiator; said refrigerating apparatus comprising a compressor driven by said engine, a condenser, an evaporator and refrigerant flow means between said compressor, condenser and evaporator; and means for transferring heat from said passenger compartment to said evaporator.

2. In a vehicle having a passenger compartment and an engine compartment; a seat located intermediate the ends of said passenger compartment; an engine within said engine compartment; a radiator in front of said engine for dissipating waste engine heat; grill means in the front wall of said engine compartment and spaced from said radiator; refrigerating apparatus mounted in the space between said grill means and said engine radiator; said refrigerating apparatus comprising a compressor driven by said engine, a condenser, an evaporator and refrigerant flow means between said compressor, condenser and evaporator; means for transferring heat from said passenger compartment to said evaporator comprising a cooling coil located beneath said seat, and a blower means for flowing air to be conditioned in thermal exchange with said cooling coil; and means for directing the air leaving said cooling coil upwardly intermediate the ends of said passenger compartment.

3. In a vehicle having a passenger compartment and an engine compartment; a seat located intermediate the ends of said passenger compartment; an engine within said engine compartment; a radiator in front of said engine for dissipating waste engine heat; grill means in the front wall of said engine compartment and spaced from said radiator; refrigerating apparatus mounted in the space between said grill means and said engine radiator; said refrigerating apparatus comprising a compressor driven by said engine, a condenser, an evaporator and refrigerant flow means between said compressor, condenser and evaporator; means for transferring heat from said passenger compartment to said evaporator comprising a cooling coil located beneath said seat, and a blower means for flowing air to be conditioned in thermal exchange with said cooling coil; means for directing the air leaving said cooling coil upwardly intermediate the ends of said passenger compartment; and means for varying the angle at which said air impinges against said ceiling.

4. Air conditioning apparatus for a vehicle having a passenger compartment provided with a seat intermediate the ends thereof, air cooling means including an air cooling coil located at the foot of said seat, fan means for flowing air for said passenger compartment in thermal exchange with said cooling means, means for directing the air leaving said cooling coil upwardly along the back of said seat and against the ceiling of the passenger compartment so as to cause a portion of the air to flow along the ceiling to the rear portion of the passenger compartment and another portion of the air to flow forwardly to the front portion of said passenger compartment, and means for varying the angle at which said air impinges against said ceiling.

RICHARD E. GOULD.